US012418912B2

(12) United States Patent
Maamari et al.

(10) Patent No.: US 12,418,912 B2
(45) Date of Patent: Sep. 16, 2025

(54) DELAY STATES AND ASSOCIATED CONFIGURATIONS

(71) Applicant: QUALCOMM Incorporated, San Diego, CA (US)

(72) Inventors: Diana Maamari, San Diego, CA (US); Huilin Xu, Temecula, CA (US); Mickael Mondet, Louannec (FR); Chih-Ping Li, San Diego, CA (US); Prashanth Haridas Hande, San Diego, CA (US); Ahmed Attia Abotabl, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 18/334,318

(22) Filed: Jun. 13, 2023

(65) Prior Publication Data

US 2024/0422601 A1 Dec. 19, 2024

(51) Int. Cl.
*H04L 43/0852* (2022.01)
*H04L 43/16* (2022.01)
(Continued)

(52) U.S. Cl.
CPC ..... *H04W 72/1268* (2013.01); *H04L 43/0852* (2013.01); *H04L 43/16* (2013.01);
(Continued)

(58) Field of Classification Search
CPC ..... H04B 17/0082–3913; H04L 5/0001–0098; H04L 43/02–55;
(Continued)

(56) References Cited

U.S. PATENT DOCUMENTS

2018/0042042 A1* 2/2018 Li ............... H04W 72/1268
2025/0008508 A1* 1/2025 Wu ............. H04W 72/1268

FOREIGN PATENT DOCUMENTS

WO WO-2023028770 A1 * 3/2023 ........ H04W 72/1268

OTHER PUBLICATIONS

He L (Qualcomm Incorporated)., et al., "Capacity Improvements for XR Services", 3GPP TSG-RAN WG2 Meeting #121, R2-2300189, Type Discussion, NR_XR_ENH, 3rd Generation Partnership Project, Mobile Competence Centre, 650, Route Des Lucioles, F-06921 Sophia-Antipolis Cedex, France, vol. 3GPP RAN 2, No. Athens, GR, Feb. 27, 2023-Mar. 3, 2023, Feb. 17, 2023, 7 Pages, XP052244840, Content of a DSR, p. 3, paragraph 2.2.3.
(Continued)

*Primary Examiner* — Timothy J Weidner
(74) *Attorney, Agent, or Firm* — Procopio, Cory, Hargreaves & Savitch LLP

(57) ABSTRACT

Method and apparatus for delay states having variable configurations. The apparatus transmits, to a network entity, a delay status report indicating an uplink delay detected by the UE, wherein the uplink delay is greater than a first threshold. The apparatus switches, subsequent to transmitting the delay status report, from a first state configuration to a second state configuration that is different than the first state configuration for transmission of uplink data before a delay budget is exceeded. The second state configuration is a delay critical state and comprises a set of configurations for the transmission of the uplink data. The apparatus communicates, with the network entity, based on the second state configuration.

30 Claims, 17 Drawing Sheets

(51) Int. Cl.
  *H04W 24/08*    (2009.01)
  *H04W 24/10*    (2009.01)
  *H04W 72/12*    (2023.01)
  *H04W 72/1268*  (2023.01)
  *H04W 76/25*    (2018.01)
  *H04W 76/38*    (2018.01)
  *H04W 84/02*    (2009.01)
  *H04W 88/02*    (2009.01)
  *H04W 88/08*    (2009.01)
  *H04W 92/02*    (2009.01)
  *H04W 92/10*    (2009.01)

(52) U.S. Cl.
  CPC ........... *H04W 24/08* (2013.01); *H04W 24/10* (2013.01); *H04W 72/1221* (2013.01); *H04W 76/25* (2018.02); *H04W 76/38* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ..... H04W 8/22–245; H04W 24/02–10; H04W 28/02–26; H04W 72/02–569; H04W 76/10–50; H04W 84/02–16; H04W 88/02–12; H04W 92/02–04; H04W 92/10
  See application file for complete search history.

(56) References Cited

OTHER PUBLICATIONS

International Search Report and Written Opinion—PCT/US2024/031546—ISA/EPO—Sep. 11, 2024.
Lenovo: "Discussion on XR-specific Capacity Enhancements", 3GPP TSG-RAN WG2 Meeting #119 electronic, R2-2207878, 3rd Generation Partnership Project, Mobile Competence Centre, 650, Route Des Lucioles, F-06921 Sophia-Antipolis Cedex, France, vol. RAN WG2, No. electronic, Aug. 17, 2022-Aug. 26, 2022, Aug. 10, 2022, 7 Pages, XP052261195, Delay Awareness, p. 3.
3GPP: "3rd Generation Partnership Project, Technical Specification Group Services and System Aspects, Study on Network Controlled Interactive Services (Release 17)", 3GPP TR 22.842, V17.2.0, Dec. 2019, pp. 1-30.
3GPP: "3rd Generation Partnership Project, Technical Specification Group Services and System Aspects, System Architecture for the 5G System (5GS), Stage 2 (Release 18)", 3GPP TS 23.501, V18.1.0, Mar. 2023, pp. 1-658, Section 5.7.4.
3GPP: "3rd Generation Partnership Project, Technical Specification Group Services and Systems Aspects, Study on Communication for Automation in Vertical Domains (Release 16)", 3GPP TR 22.804, V16.3.0, Jul. 2020, pp. 1-197, Section 5.8, including the Subsections.

* cited by examiner

| 5QI Value | Packet Delay Budget | Packet Error Rate | Default Maximum Data Burst Volume | Example Services |
|---|---|---|---|---|
| 1 | 100 ms | $10^{-2}$ | N/A | Conversational Voice } eMBB |
| 2 | 150 ms | $10^{-3}$ | N/A | Conversational Voice (Live streaming) |
| 6, 8, 9 | 300 ms | $10^{-6}$ | N/A | Video (Buffered streaming), TCP based (e.g., internet, e-mail, chat, ftp, p2p file sharing, progressive video, etc.) |
| 80 | 10 ms | $10^{-6}$ | N/A | Low Latency eMBB applications, Augmented Reality — XR |
| 81 | 5 ms | $10^{-5}$ | 160 B | Remote control — URLLC |

FIG. 4

| CCE aggregation level | Number of candidates |
|---|---|
| 1 | 0 |
| 2 | 0 |
| 4 | 8 (4DL + 4UL) |
| 8 | 4 (2DL + 2UL) |
| 16 | 2 (1DL + 1UL) |
| Total (DL + UL) | 14 |

DELAY STATES AND ASSOCIATED CONFIGURATIONS

TECHNICAL FIELD

The present disclosure relates generally to communication systems, and more particularly, to a configuration for delay states having variable configurations.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits, to a network entity, a delay status report indicating an uplink delay detected by the UE, wherein the uplink delay is greater than a first threshold. The apparatus switches, subsequent to the transmitting the delay status report, from a first state configuration to a second state configuration that is different than the first state configuration for transmission of uplink data before a delay budget is exceeded, wherein the second state configuration is a delay critical state and comprises a set of configurations for the transmission of the uplink data. The apparatus communicates, with the network entity, based on the second state configuration.

In an aspect of the disclosure, a method, a computer-readable medium, and an apparatus are provided. The apparatus may be a device at a network node. The device may be a processor and/or a modem at a network node or the network node itself. The apparatus obtaining, from a user equipment (UE) in a first state configuration, a delay status report indicating an uplink delay detected by the UE, wherein the uplink delay is greater than a first threshold. The apparatus communicates with the UE in a second state configuration, wherein the second state configuration is different than the first state configuration where uplink data is transmitted by the UE before a delay budget is exceeded, wherein the second state configuration is a delay critical state and comprises a set of configurations for the transmission of the uplink data.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating example parameters of eMBB, URLLC, and XR.

FIG. 9 is a diagram illustrating an example of a configuration of PDCCH candidates for downlink and uplink DCI.

DETAILED DESCRIPTION

Figure 1:
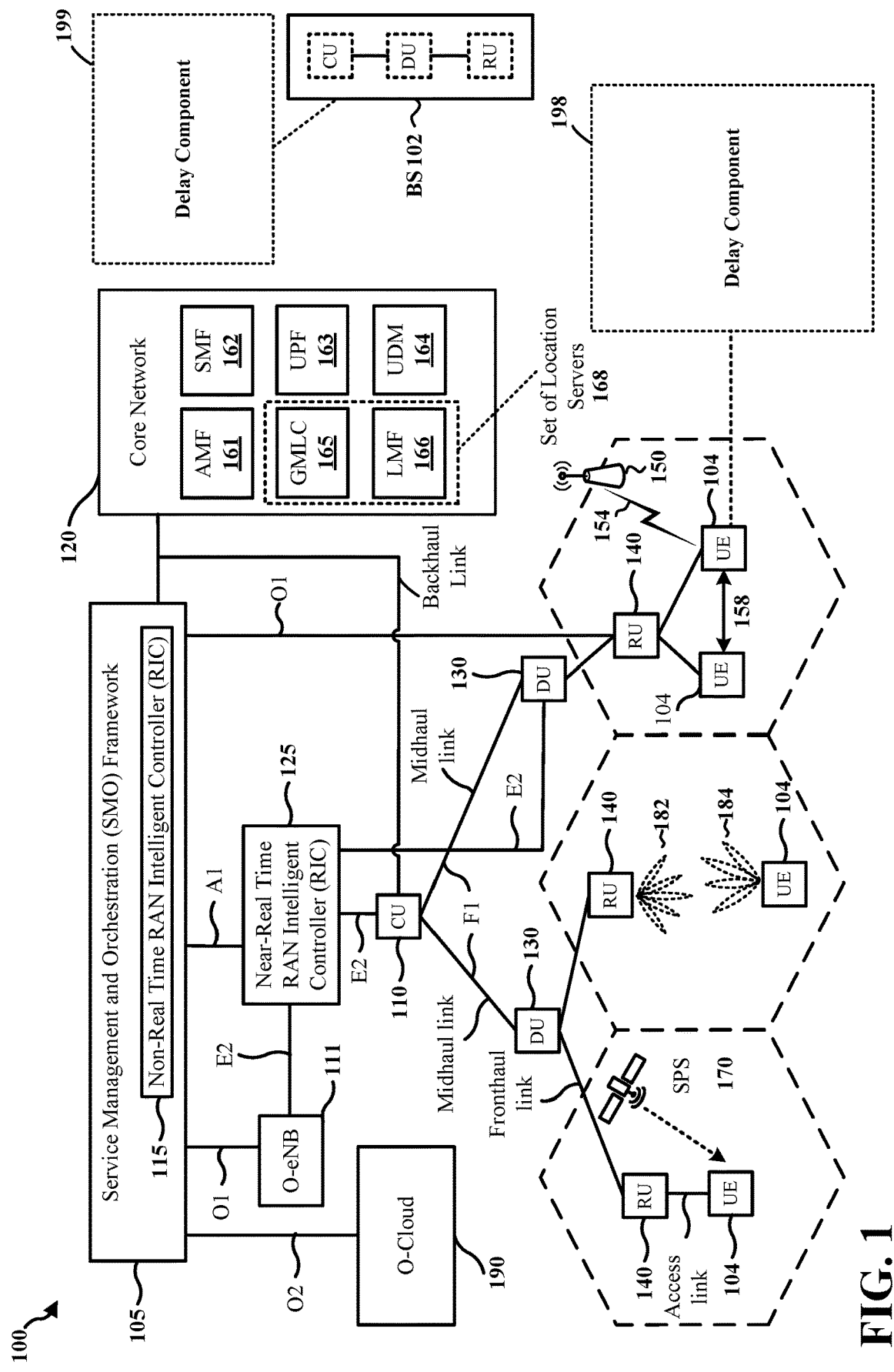
FIG. 1 is a diagram illustrating an example of a wireless communications system and an access network.

Applications utilized via wireless communications, such as extended reality (XR) applications, may have strict delay budgets. For example, XR may have a lower packet error rate (PER) and stricter delay budgets than eMBB. From a system level perspective, a delay aware scheduler at a network entity (e.g., base station) may be useful in comparison to a proportional fairness scheduler, where the delay aware scheduler may take the remaining or available uplink delay budget into account when scheduling UEs on subbands. A base station may not be aware of the delay state in the uplink direction due in part to packets sitting in a UE buffer for quite some time before a scheduling request (SR) is issued. A UE may be configured to transmit a delay status report in an effort to enhance XR performance. In instances where a UE is in latency sensitive scenario, such that the remaining uplink delay budget may be approaching a nominal packet delay budget, the UE may report a delay status report (DSR) corresponding to the remaining uplink delay budget.

In some instances, a base station obtaining the DSR may result in the base station determining that the UE uplink delay budget is almost or about to be exceeded. As such, the base station may schedule the UE with more resources using uplink dynamic grants as part of implementing a delay aware scheduler, such that UEs that have reported a DSR and their remaining uplink delay budget is approaching the nominal delay budget may be given priority.

Aspects presented herein provide a configuration for a UE to switch to a different configuration in instances where the UE is in a delay critical zone. For example, a UE may transmit a delay status report indicating uplink delay detected by the UE exceeding a threshold amount, such that the UE may switch to a different configuration to allow for transmission of uplink data before exceeding a delay budget.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2. FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a delay component 198 that may be configured to transmit, to a network entity, a delay status report indicating an uplink delay detected by the UE, wherein the uplink delay is greater than a first threshold; switch, subsequent to the transmitting the delay status report, from a first state configuration to a second state configuration that is different than the first state configuration for transmission of uplink data before a delay budget is exceeded, wherein the second state configuration is a delay critical state and comprises a set of configurations for the transmission of the uplink data; and communicate, with the network entity, based on the second state configuration.

Referring again to FIG. 1, in certain aspects, the base station 102 may comprise a delay component 199 that may be configured to obtain, from a user equipment (UE) in a first state configuration, a delay status report indicating an uplink delay detected by the UE, wherein the uplink delay is greater than a first threshold; and communicate with the UE in a second state configuration, wherein the second state configuration is different than the first state configuration where uplink data is transmitted by the UE before a delay budget is exceeded, wherein the second state configuration is a delay critical state and comprises a set of configurations for the transmission of the uplink data.

Although the following description may be focused on 5G NR, the concepts described herein may be applicable to other similar areas, such as LTE, LTE-A, CDMA, GSM, and other wireless technologies.

Figure 2:
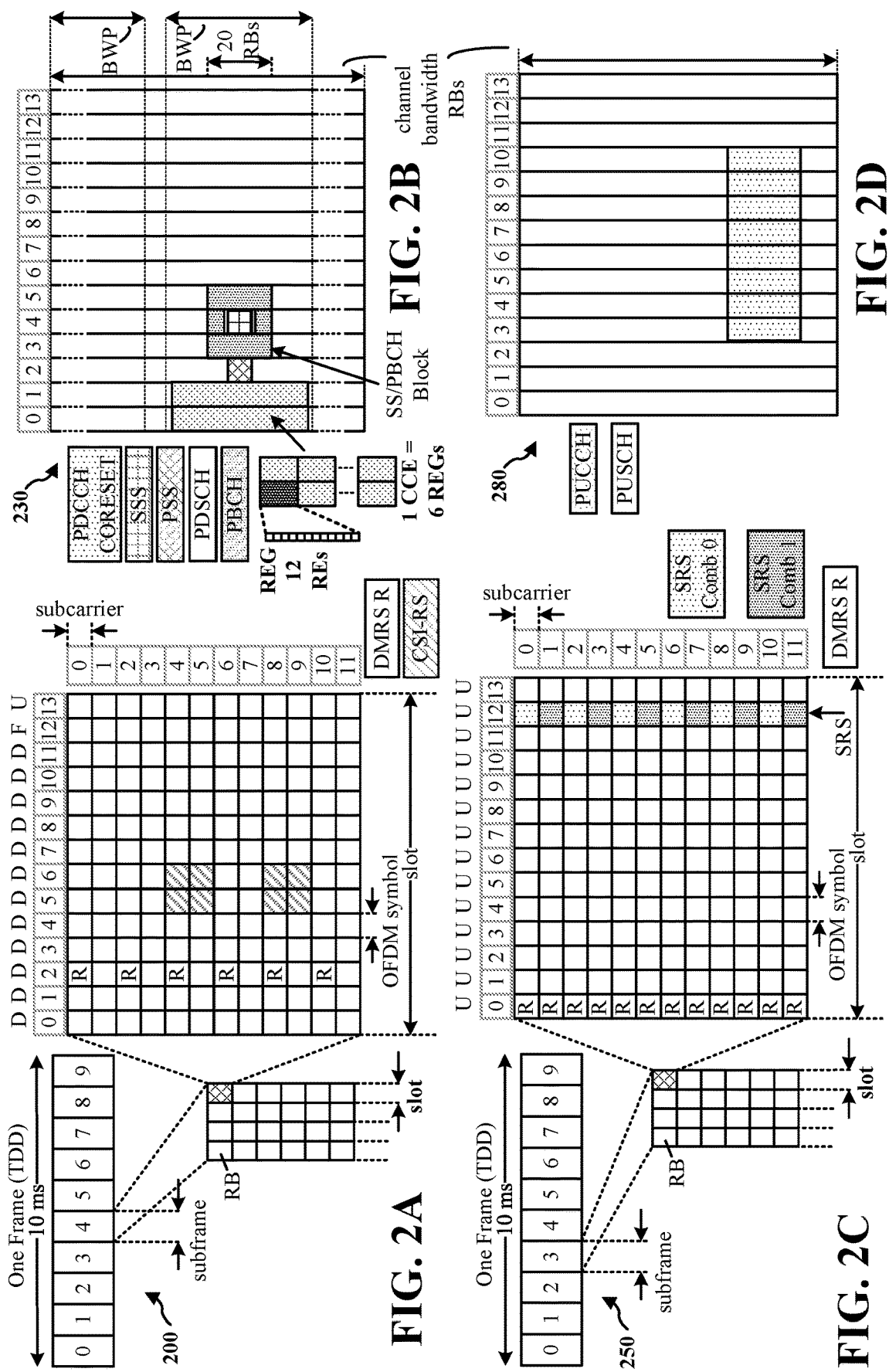
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI) through a received slot format indicator (SFI), or semi-statically/statically through radio resource control (RRC) signaling) Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 24 slots/subframe. The subcarrier spacing may be equal to $2^\mu * 15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a delay status report, or any other MAC-CE, a power headroom report (PHR), and/or UCI.

Figure 3:
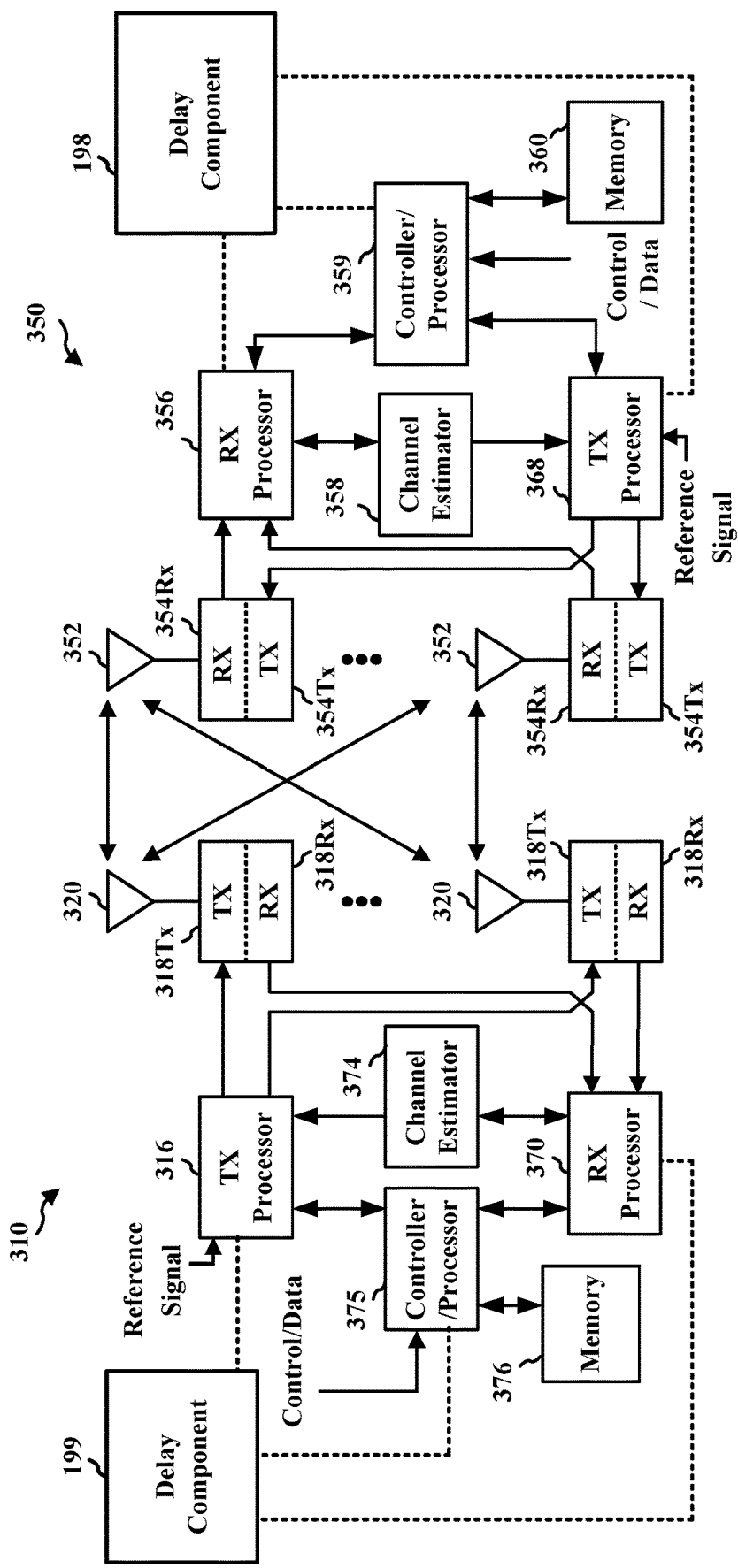
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the delay component 198 of FIG. 1.

At least one of the TX processor 316, the RX processor 370, and the controller/processor 375 may be configured to perform aspects in connection with the delay component 199 of FIG. 1.

Applications utilized via wireless communications, such as XR applications, may have strict delay budgets. For example, for eMBB 5QI indices are usually the first few rows with larger delay budgets and may have a higher PER, while XR may have a lower PER and stricter delay budgets than eMBB. From a system level perspective, a delay aware scheduler at a network entity (e.g., base station) may be useful in comparison to a proportional fairness scheduler, where the delay aware scheduler may take the remaining or available uplink delay budget into account when scheduling UEs on sub-bands.

Diagram 400 of FIG. 4 provides example parameters of eMBB, URLLC, and XR. As shown in diagram 400, eMBB may have a relatively not a stringent latency requirement (e.g., 100 ms<packet delay budget<300 ms) and a packet error rate ranging from $1\ e^{-2}$ to $1\ e^{-6}$. Some example services of eMBB may include conversational voice, live streaming, video, internet, e-mail, chat, file transfer protocol (FTP), peer-to-peer (P2P) file sharing, progressive video, or the like. As shown in diagram 400, XR may have a high bit rate and a high reliability (e.g., packet error rate≤$1\ e^{-3}$) and a low latency requirement (e.g., 5 ms<packet delay budget≤25 ms). Some example services of XR applications may include virtual reality (VR) or augmented reality (AR) split rendering, cloud gaming, or other low latency eMBB applications. With XR, a packet should be delivered within 10 ms for example to be successful, otherwise the packet may be considered as a packet in error and may contribute to the packet error rate. Uplink video may have a relaxed packet delay budget (PDB) such as 30 msec compared to pose packets that may require 10 msec PDB. As shown in diagram 400, URLLC may have a very low latency (e.g., packet delay budget≤5 ms), a high reliability (e.g., packet error rate<$1\ e^{-5}$), and a low data rate traffic. XR applications consist of burst of packets, as such metrics such Packet Data Unit Sets and Packet Data Unit Delay budget and Packet Data Unit Set Error rates may be configured as part of the QoS.

In some instances, a base station may not be aware of the delay state in the uplink direction due in part to packets sitting in a UE buffer for quite some time before a scheduling request (SR) is issued. A UE may be configured to transmit a delay status report in an effort to enhance XR performance. Delay status reporting may be similar to a buffer status report, however, with a DSR, the UE may report the experienced delays for different logical channels rather than a buffer size. In instances where a UE is in latency sensitive scenario, and the remaining uplink delay budget is approaching a nominal packet delay budget, the UE may report a DSR corresponding to the remaining uplink delay budget.

Figure 5:
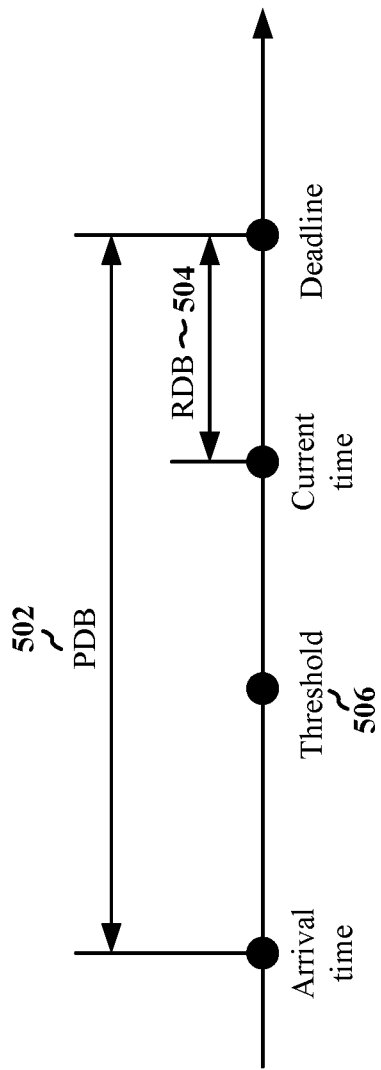
FIG. 5 is a diagram illustrating an example timeline of transmission of a delay status report (DSR).

A UE may be configured to report delay in a manner similar to how a UE reports a buffer status report for different logical channels. For example, transmission of a DSR may occur based on events or instances that may trigger the transmission of the DSR. The network may configure which logical channel groups (LCGs) may report the DSR. The DSR may be event triggered or timer triggered (e.g., configured per LCG). For event triggered instances, the network may configure a reporting threshold on a remaining delay budget (RDB). The threshold may be the same between logical channels or different. For example, if one logical channel delay exceeds the threshold, the DSR can be triggered. A delay status report may be triggered if a minimum RDB 504, of a PDB 502, among all PDUs in this LCG is below a threshold 506, as shown for example in diagram 500 of FIG. 5. For timer triggered instances, the network may configure a periodic timer, such that expiration of the periodic timer may trigger transmission of the delay status report. The DSR may be a statiscal DSR, in this case the DSR includes first or second order statistics such as mean, variance, standard deviation for one or more logical channels.

Figure 6:
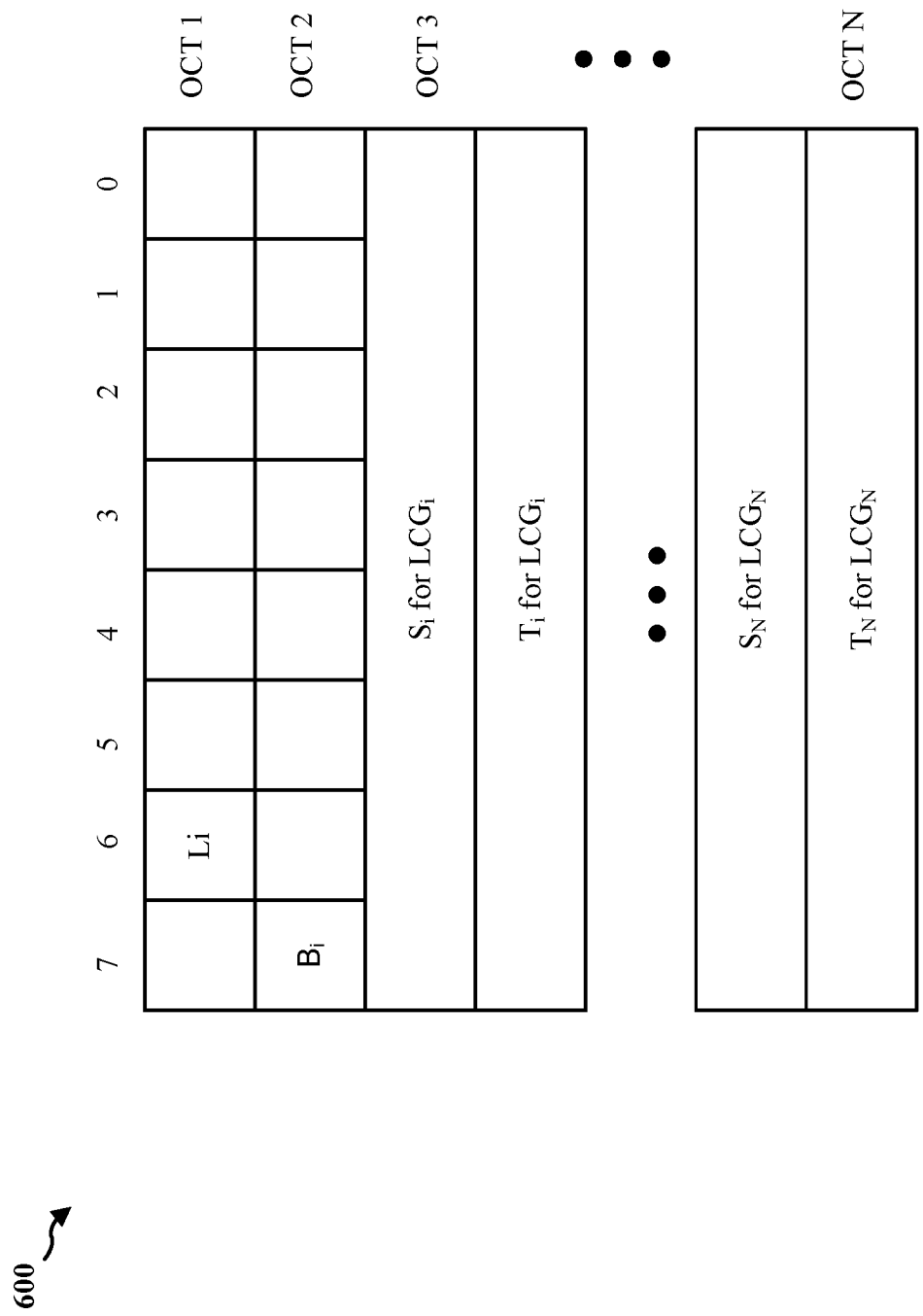
FIG. 6 is a diagram illustrating an example of a DSR.

FIG. 6 is a diagram 600 of an example of a DSR. The DSR of diagram 600 may comprise a bitmap indicating which LCGs the UE is reporting. The DSR may comprise a sampling instance (Si) which may indicate an amount of data reported for the specific LCG at the sampling instance. In some instances, Si may be encoded in a manner similar to BSR tables. The DSR may comprise a duration indication ($T_i$) which indicates the duration between the sampling instance and a transmission time of the DSR (e.g., in a PUSCH). The duration indication may be in a unit of slots, where a maximum value is 32 ms×8 slots/ms. In some instances, the sampling instance may correspond to the slot in which the DSR was triggered. In some instances, the sampling instance may correspond to the slot in which a MAC PDU comprising the delay report is assembled.

In some instances, a network entity (e.g., base station) obtaining the DSR may result in the network entity realizing that the UE uplink delay budget is almost or about to be exceeded. As such, the network entity may schedule the UE with more resources using uplink dynamic grants as part of implementing a delay aware scheduler, such that UEs that have reported a DSR may be given priority.

Aspects presented herein provide a configuration for a UE to switch to a different configuration in instances where the UE is in a delay critical zone. For example, a UE may transmit a delay status report indicating uplink delay detected by the UE exceeding a threshold amount, such that the UE may switch to a different communication state with optimized configurations to allow for transmission of uplink data before exceeding a delay budget. At least one advantage of the disclosure is that the UE may switch to a different communication state (zone) wherein configurations are configured (e.g., by the network entity) to ensure that uplink data is transmitted before the delay budget is exceeded.

In some instances, PDCCH monitoring which may be based on search space set group (SSSG) switching with uplink/downlink scheduling dedicated SSSs so that a SSSG switching may switch the UE from one SSSG where the UE is monitoring both type of DCIs (e.g., DL and UL) to another SSSG with one type of DCI monitoring (e.g., only DL or UL DCIs) which may reduce the power consumption and allows more optimized scheduling. In some instances, configured grant or semi-persistent scheduling adaptation may be utilized, such as but not limited to a number of occasions per period or inter-occasion interval (or density of occasions).

Figure 7:
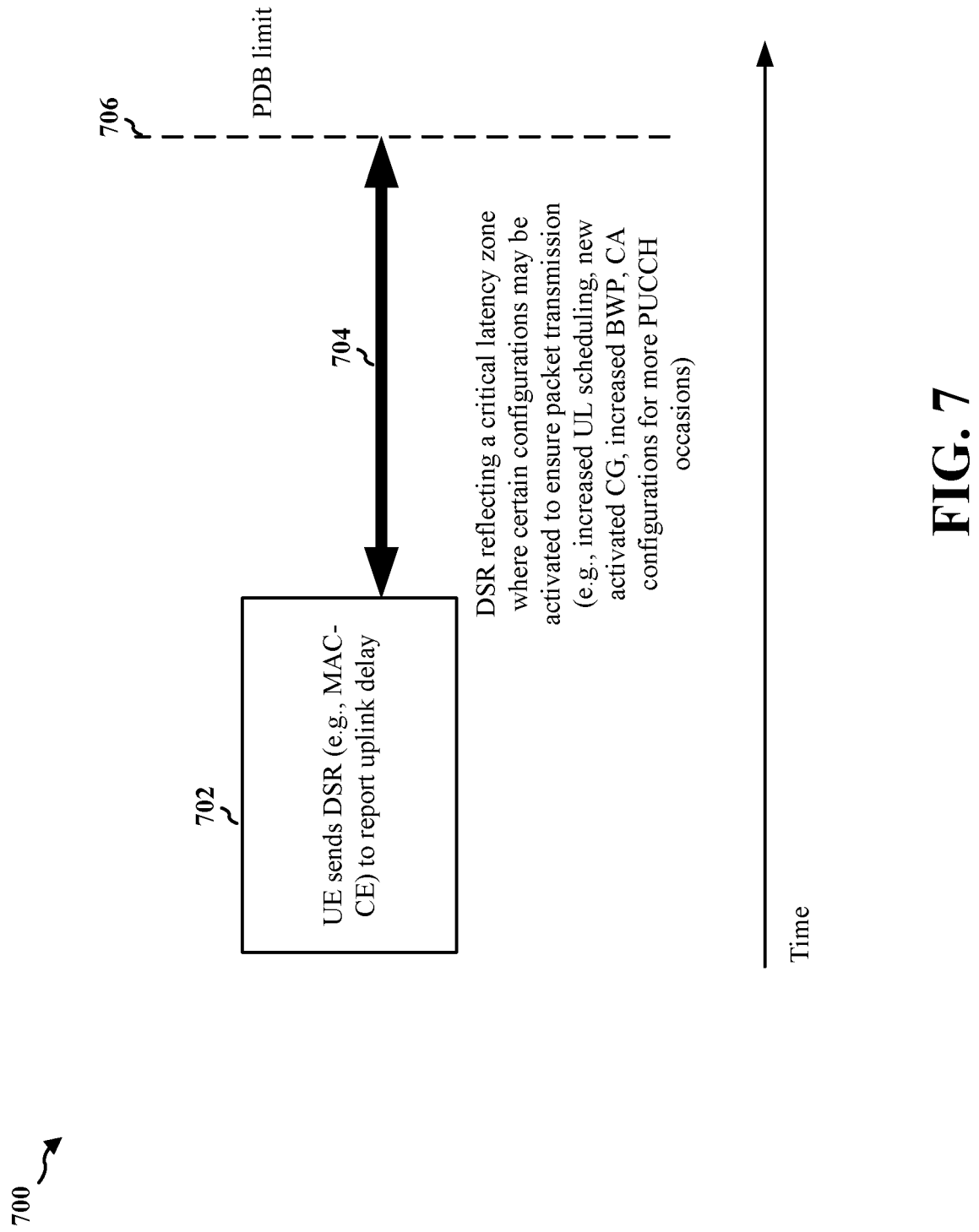
FIG. 7 is a diagram illustrating an example timeline of transmission of a DSR.

A UE may send a DSR (e.g., MAC-CE) to report that the uplink delay detected at the UE, as shown for example at 702 of diagram 700 of FIG. 7. The DSR may indicate that the UE is within a critical latency zone 704, such that a PDB limit 706 of the PDB is going to be exceeded. When the UE is within the critical latency zone 704, certain configurations may be activated to ensure packet transmission. In some aspects, the configurations that may be activated to ensure packet transmission may comprise at least one of increased UL scheduling, new activated CG, increased BWP, CA configurations for more PUCCH occasions, smaller kmin values, retransmission-less CG, new configurations on MAC timers, new HARQ modes assumptions such as HARQ mode A and B where HARQ retransmission timers and HARQ round trip time (RTT) timers are started or not, certain configurations on downlink feedback information (DFI) (e.g., for NR-U), certain assumptions on gaps such as skipping gaps for measurement in order to prioritize data, relaxed scheduled restrictions such as being allowed to transmit PUSCH instead of measuring SSB, certain assumptions on reporting such as skipping some reports.

Figure 8:
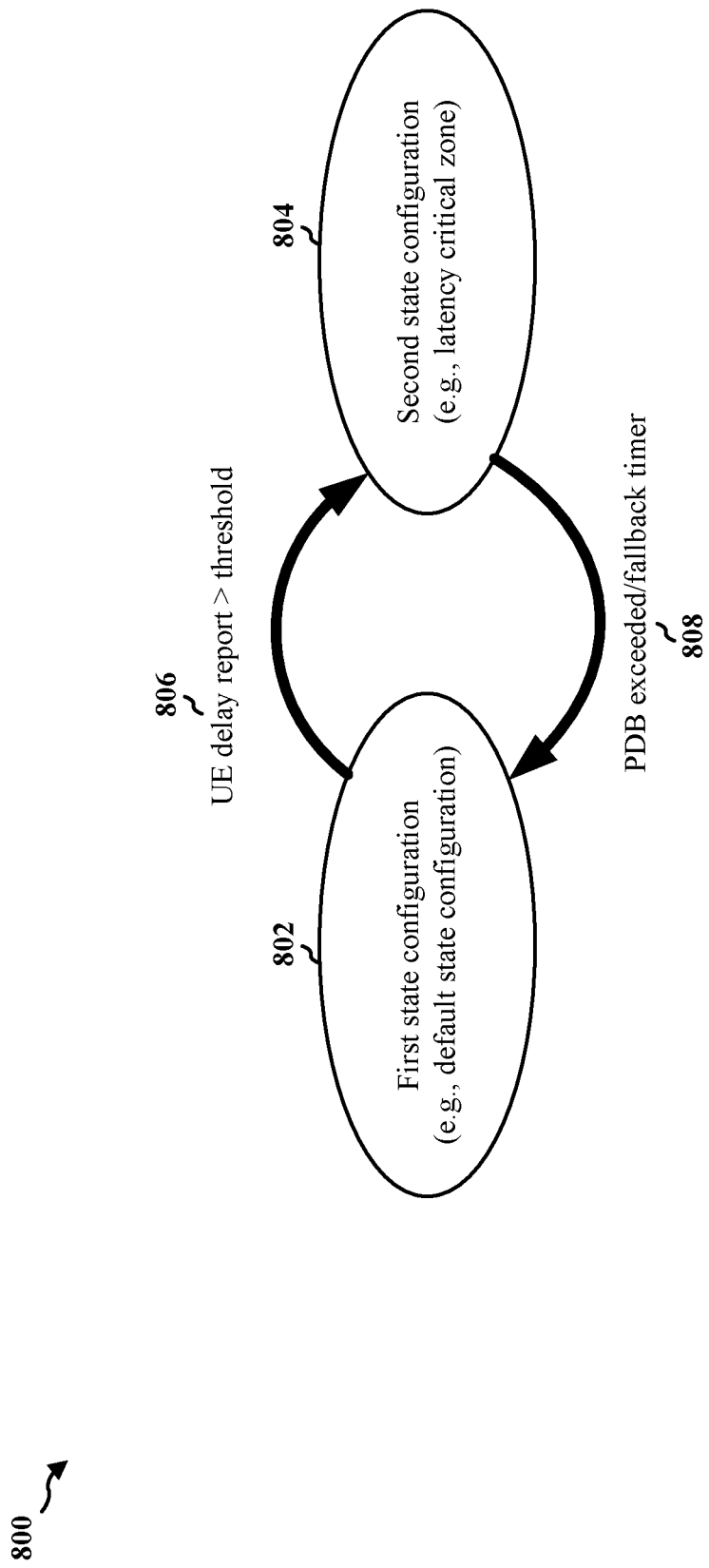
FIG. 8 is a diagram illustrating an example of switching between a first state configuration and a second state configuration.

A transmission of a delay report may convey the uplink remaining delay budget information having a value greater than a threshold (e.g., configurable or pre-configured). The delay report may indicate that the remaining delay budget for at least one or more logical channels is within a limit that is close to exceeding the delay budget and may trigger the UE to move to a delay state or zone with configurations that may accommodate the uplink transmissions before exceeding the delay budget. With reference to diagram 800 of FIG. 8, the UE may operate in a first state 802 (e.g., default state), and may transmit the DSR indicating that the UE delay report 806 is greater than the threshold, such that the UE switches to a second state 804 (e.g., UE within a latency critical zone). The UE being within the latency critical zone may communicate based on the second state 804, where the second state 804 may have one or more configurations to accommodate the uplink transmissions prior to exceeding the delay budget. In some aspects, the one or more configurations may comprise one or more of a biased search space to uplink DCI, a deactivation of monitoring of uplink cancellation, an increased uplink bandwidth part or active bandwidth part, activation of one or more configured grant configurations, activation of supplementary uplink (SUL), a deactivation of wake up signal monitoring, a deactivation of cancellation indication monitoring, or one or more configurations on reference signal (RS). The biased search space may comprise a bias to one type of DCI over another type of DCI. For example, the biased search space may comprise a bias to uplink DCI over downlink DCI in an effort to allow for transmission of the uplink data. The UE, at 808, may switch from the second state back to the first state based at least on a fallback timer or exceeding the packet delay budget.

In some aspects, On the transitioning, in one direction the transition is based on Delay reported and the fall back timer to the default state is based on the expiry of the Packet delay budget. In that sense the fall back is not associated with fixed RRC configured timer rather the timer is adaptive and measured from the delay experienced to the PDB. There can be multiple states and each state can have its own configurations. A transition to the delay sensitive zone activates the bundled optimized configurations together. The gNB can configure multiple of these Latency states in RRC with conditions to transition to along with the DSR triggers.

In some aspects, a configuration of PDCCH candidates for downlink and uplink DCI may be associated with each other. For example, for a UE-specific search space configuration, a higher layer parameter (e.g., dci-Formats) may set a UE to monitor PDCCH candidates either for DCI format 0_0 (e.g., uplink) and DCI format 1_0 (e.g., downlink), or for DCI format 0_1 (e.g., uplink) and DCI format 1_1 (e.g., downlink). If a UE is configured to monitor DCI format 0_0 and DCI format 1_0, a single blind decoding may be utilized to determine whether the candidate is downlink or uplink DCI. The sizes of DCI formats 0_1 and 1_1 may depend on the configuration and may be the same or different. If the sizes of the DCI formats are different, then they may be treated as different PDCCH candidates, such that separate blind decoding is utilized, which may lead to an increase in power consumption. In some applications, the latency or remaining uplink delay budget in UL or DL may translate into the need for more scheduling opportunities in UL or DL to fulfill packet transmissions before a PDB is exceeded. However, either DL or UL may only use the half of the maximum PDCCH candidates, and the number of maximum PDCCH candidates per slot is limited, as shown for example in diagram 900 of FIG. 9.

Figure 10:
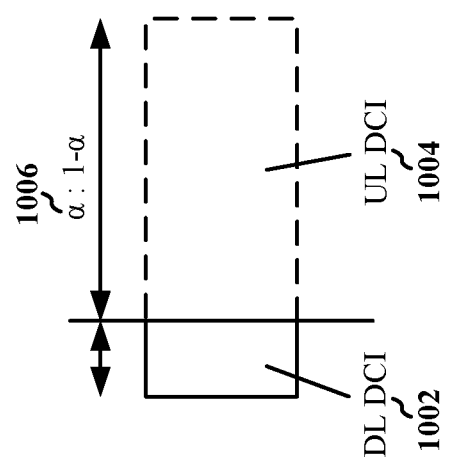
FIG. 10 is a diagram illustrating an example of a scaling factor.

In some aspects, PDCCH monitoring may be enhanced. For example, a biased search space may be activated upon activation of the second state. The biased search based of the second state may comprise a new scaling factor 1006 (e.g., a) may accommodate for an increase in uplink DCIs 1004, as shown in diagram 1000 of FIG. 10, while keeping the same BD budget (or even reduced budget). The new scaling factor may specify the manner in which PDCCH monitoring occasions may be split between downlink DCI 1002 and uplink DCI 1004 for the period of time which corresponds to the remaining uplink delay. In some aspects, a remaining delay budget (T)>50% of the PDB may comprise a default SSS with a split of downlink and uplink. In some aspects, a remaining delay budget of 50%>T>20% of the PDB may comprise an SSS and a new scaling factor value of 0.7. In some aspects, a remaining delay budget (T)<20% of the PDB may comprise an SSS and a new scaling factor value of 1. The UE may indicate the value of the remaining delay budget (T) within the DSR. The network may determine and/or select a value of a new scaling factor based on the T. The new scaling factor may be configured via RRC signaling.

The new state (e.g., second state) may remain active until a subsequent DSR is reported. That is when a new DSR is triggered a new state is activated. In some aspects, the DSR may indicate downlink delay detected at the UE to cover downlink delay within a critical zone and possibly exceeding the PDB. In some aspects, a UE may wait for a response from the network (e.g., base station) before transitioning to the latency zone state or the second state. However, since the DSR is a MAC-CE it mostly protected by HARQ so the chances are better than with UCI.

In some aspects, the network may control the split scaling and may configure sets with a value for the new scaling factor via RRC signaling. In some aspects, the network may enable or disable the split feature based on the type of traffic. For example, if there is heavy downlink traffic and an expectation of DL+UL states, then the split may be disabled.

Figure 11:
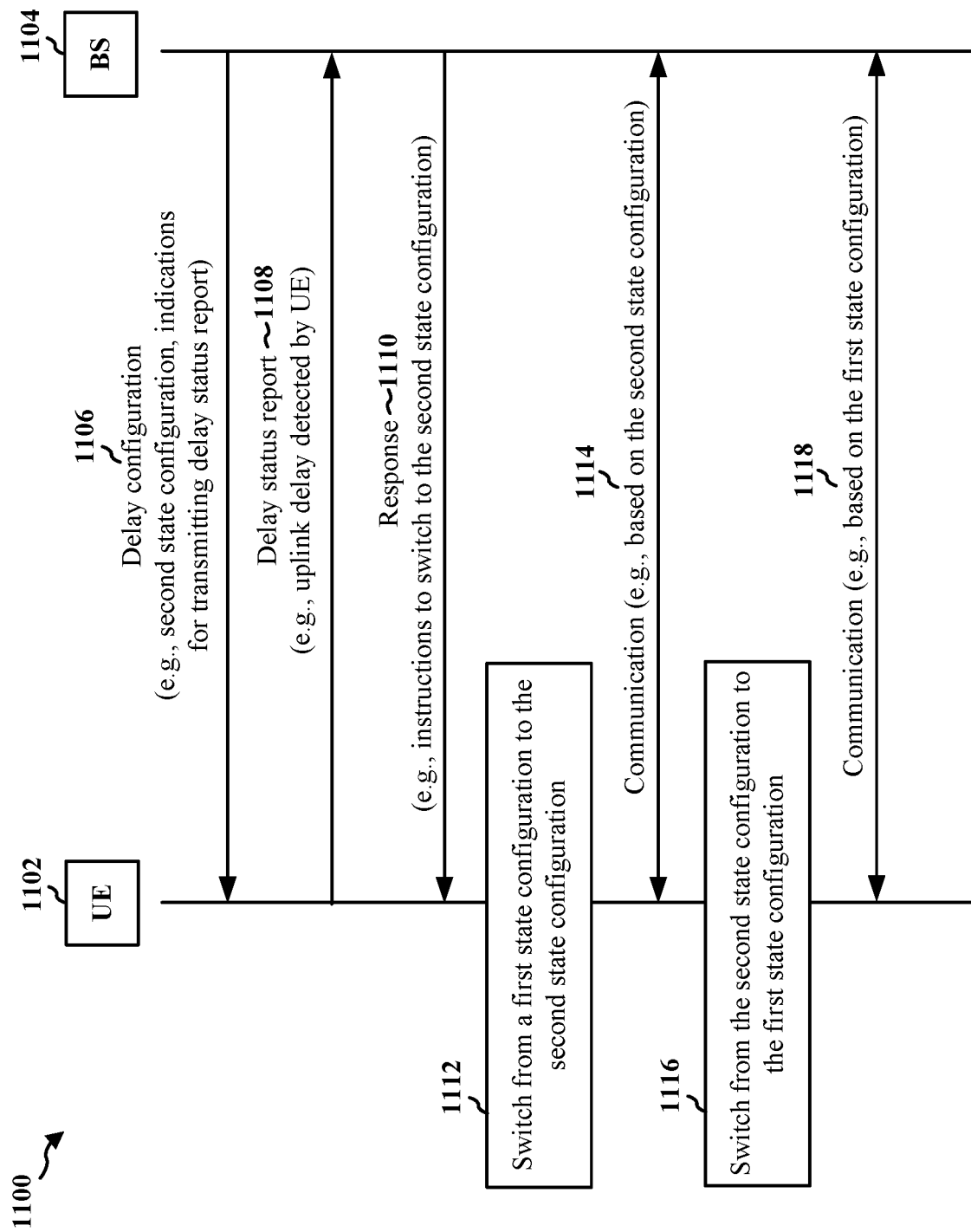
FIG. 11 is a call flow diagram of signaling between a UE and a base station.

FIG. 11 is a call flow diagram 1100 of signaling between a UE 1102 and a base station 1104. The base station 1104 may be configured to provide at least one cell. The UE 1102 may be configured to communicate with the base station 1104. For example, in the context of FIG. 1, the base station 1104 may correspond to base station 102 and the UE 1102 may correspond to at least UE 104. In another example, in the context of FIG. 3, the base station 1104 may correspond to base station 310 and the UE 1102 may correspond to UE 350.

At 1106, the base station 1104 may transmit a delay configuration the UE 1102, as described in connection with any of FIGS. 5-10. The UE 1102 may receive the delay configuration from the base station 1104. The delay configuration may comprise a second state configuration and one or more indications for transmission of a delay status report.

At 1108, the UE 1102 may transmit the delay status report the base station 1104, as described in connection with any of FIGS. 5-10. The base station 1104 may obtain the delay status report from the UE 1102. The delay status report may indicate an uplink delay detected by the UE. The uplink delay may be greater than or exceed a first threshold. In some aspects, the uplink delay being greater than or exceeding the first threshold may indicate that the transmission of the uplink data is within a delay limit of the delay budget. For example, the delay limit of the delay budget may correspond to a percentage or a proportion of the delay budget that is met prior to exceeding the delay budget. In some instances, the UE may perform an action in response to the uplink delay being greater than or exceeding the first threshold.

At 1110, the base station 1104 may transmit a response to switch from the first state configuration to the second state configuration to the UE 1102, as described in connection with any of FIGS. 5-10. The UE may receive the response having instructions to switch from the first state configuration to the second state configuration from the base station 1104. The base station may transmit the response comprising instructions for the UE to switch from the first state configuration to the second state configuration in response to obtaining the delay status report transmitted by the UE.

At 1112, the UE 1102 may switch from a first state configuration to the second state configuration, as described in connection with any of FIGS. 5-10. The UE may switch from the first state configuration to the second state configuration subsequent to the transmission the delay status report. In some aspects, the UE may switch from the first state configuration to the second state configuration automatically or in response to transmitting the delay status report. In some aspects, the UE may switch from the first state configuration to the second state configuration in response to receipt of the instructions from the base station to switch from the first state configuration to the second state configuration. The UE may switch from the first state configuration to the second state configuration for transmission of uplink data before the delay budget is exceeded. The second state configuration may be different than the first state configuration. For example, the second state configuration may be a delay critical state and may comprise a set of configurations for the transmission of the uplink data. In some aspects, a switch from the first state configuration to the second state configuration may be based on the transmission of the uplink data within the delay limit. For example, the UE may switch from the first state configuration to the second state configuration in response to the transmission of the uplink data within the delay limit. The transmission of the uplink data within the delay limit may trigger the UE to switch from the first state configuration to the second state configuration in an effort to ensure transmission of the uplink data before the delay budget is exceeded. In some aspects, the second state configuration comprises at least one of a biased search space to uplink DCI, a deactivation of monitoring of uplink cancellation, an increased uplink bandwidth part or active bandwidth part, activation of one or more configured grant configurations, activation of SUL, a deactivation of wake up signal monitoring, a deactivation of cancellation indication monitoring, or one or more configurations on RS. In some aspects, the biased search space may comprise a new scaling factor to accommodate for an increase in uplink DCIs. The new scaling factor may configure PDCCH monitoring occasions between downlink DCI and uplink DCI while the UE is in the second state configuration. In some aspects, the switching from the first state configuration to the second state configuration may activate one or more attributes of the second state configuration.

At 1114, the UE 1102 may communicate with the base station 1104 based on the second state configuration, as described in connection with any of FIGS. 5-10. Communication with the base station 1104 based on the second state configuration may allow for transmission of the uplink data before the delay budget being exceeded.

At 1116, the UE 1102 may switch from the second state configuration to the first state configuration, as described in connection with any of FIGS. 5-10. The UE may switch from the second state configuration to the first state configuration based on at least one of a fall back timer or the delay budget being exceeded. Expiration of the fall back timer or exceeding the delay budget may ensure that the UE switches back to the first state configuration and does not remain in the second state configuration.

At 1118, the UE 1102, after switching from the second state configuration to the first state configuration, may communicate with the base station 1104 based on the first state configuration, as described in connection with any of FIGS. 5-10.

Figure 12:
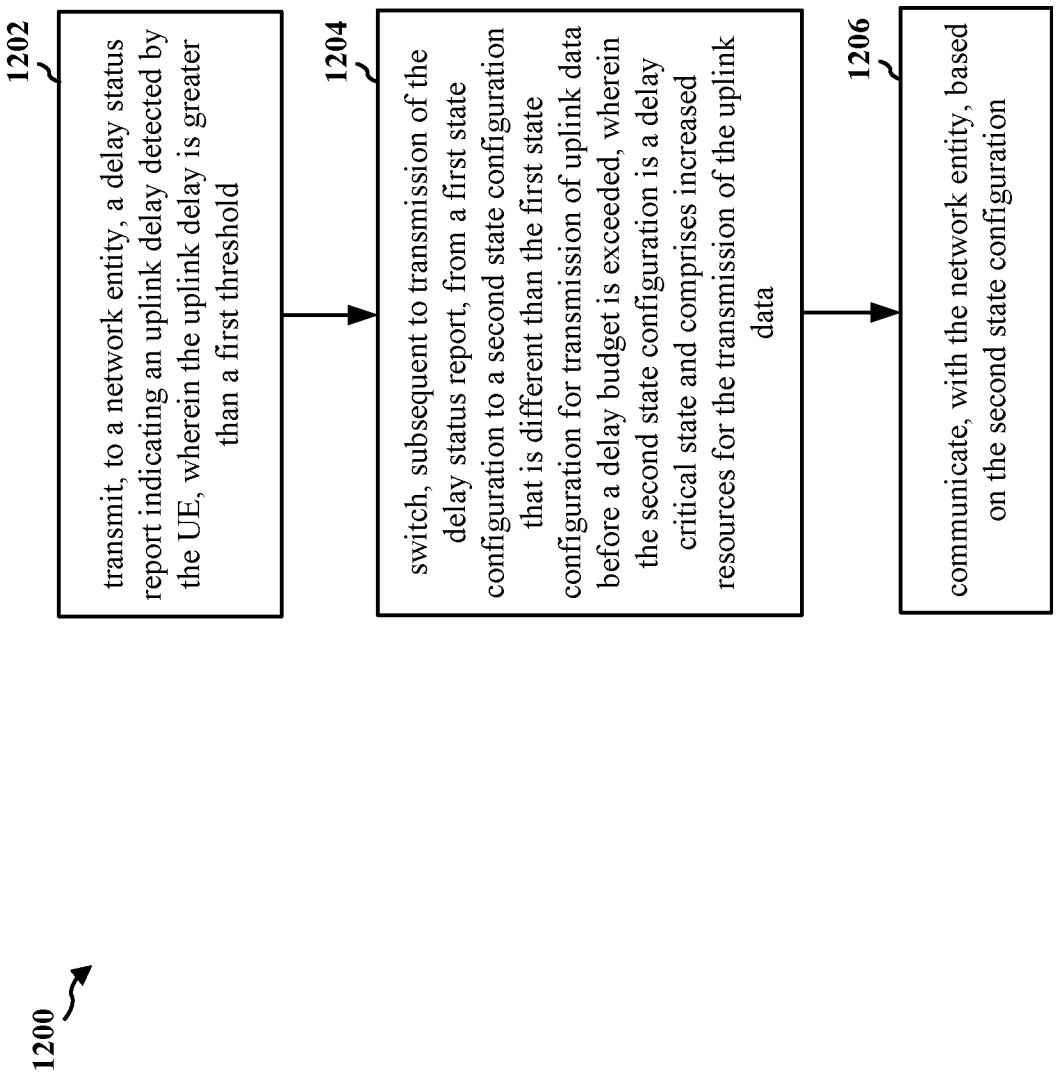
FIG. 12 is a flowchart of a method of wireless communication.

FIG. 12 is a flowchart 1200 of a method of wireless communication. The method may be performed by a UE (e.g., the UE 104; the apparatus 1404). One or more of the illustrated operations may be omitted, transposed, or contemporaneous. The method may allow a UE to switch to a different configuration to allow for additional resources for uplink data transmissions when uplink delay exceeds a threshold.

At 1202, the UE may transmit a delay status report. For example, 1202 may be performed by delay component 198 of apparatus 1404. The UE may transmit the delay status report to a network entity, as described in connection with any of FIGS. 5-10. The delay status report may indicate an uplink delay detected by the UE. The uplink delay may be greater than or exceed a first threshold. In some aspects, the uplink delay being greater than or exceeding the first threshold may indicate that the transmission of the uplink data is within a delay limit of the delay budget. For example, the delay limit of the delay budget may correspond to a percentage or a proportion of the delay budget that is met prior to exceeding the delay budget. In some instances, the UE may perform an action in response to the uplink delay being greater than or exceeding the first threshold.

At 1204, the UE may switch from a first state configuration to a second state configuration. For example, 1204 may be performed by delay component 198 of apparatus 1404. The UE may switch from the first state configuration to the second state configuration subsequent to the transmission the delay status report, as described in connection with any of FIGS. 5-10. The UE may switch from the first state configuration to the second state configuration for transmission of uplink data before the delay budget is exceeded. The second state configuration may be different than the first state configuration. The second state configuration may be a delay critical state and may comprise a set of configurations for the transmission of the uplink data. In some aspects, a switch from the first state configuration to the second state configuration may be based on the transmission of the uplink data within the delay limit. For example, the UE may switch from the first state configuration to the second state configuration in response to the transmission of the uplink data within the delay limit. The transmission of the uplink data within the delay limit may trigger the UE to switch from the first state configuration to the second state configuration in an effort to ensure transmission of the uplink data before the delay budget is exceeded. In some aspects, the second state configuration comprises at least one of a biased search space to uplink DCI, a deactivation of monitoring of uplink cancellation, an increased uplink bandwidth part or active bandwidth part, activation of one or more configured grant configurations, activation of SUL, a deactivation of wake up signal monitoring, a deactivation of cancellation indication monitoring, or one or more configurations on RS. In some aspects, the biased search space may comprise a new scaling factor to accommodate for an increase in uplink DCIs. The new scaling factor may configure PDCCH monitoring occasions between downlink DCI and uplink DCI while the UE is in the second state configuration. In some aspects, the switching from the first state configuration to the second state configuration may activate one or more attributes of the second state configuration.

At 1206, the UE may communicate based on the second state configuration. For example, 1206 may be performed by delay component 198 of apparatus 1404. The UE may communicate with the network entity based on the second state configuration, as described in connection with any of FIGS. 5-10.

Figure 13:
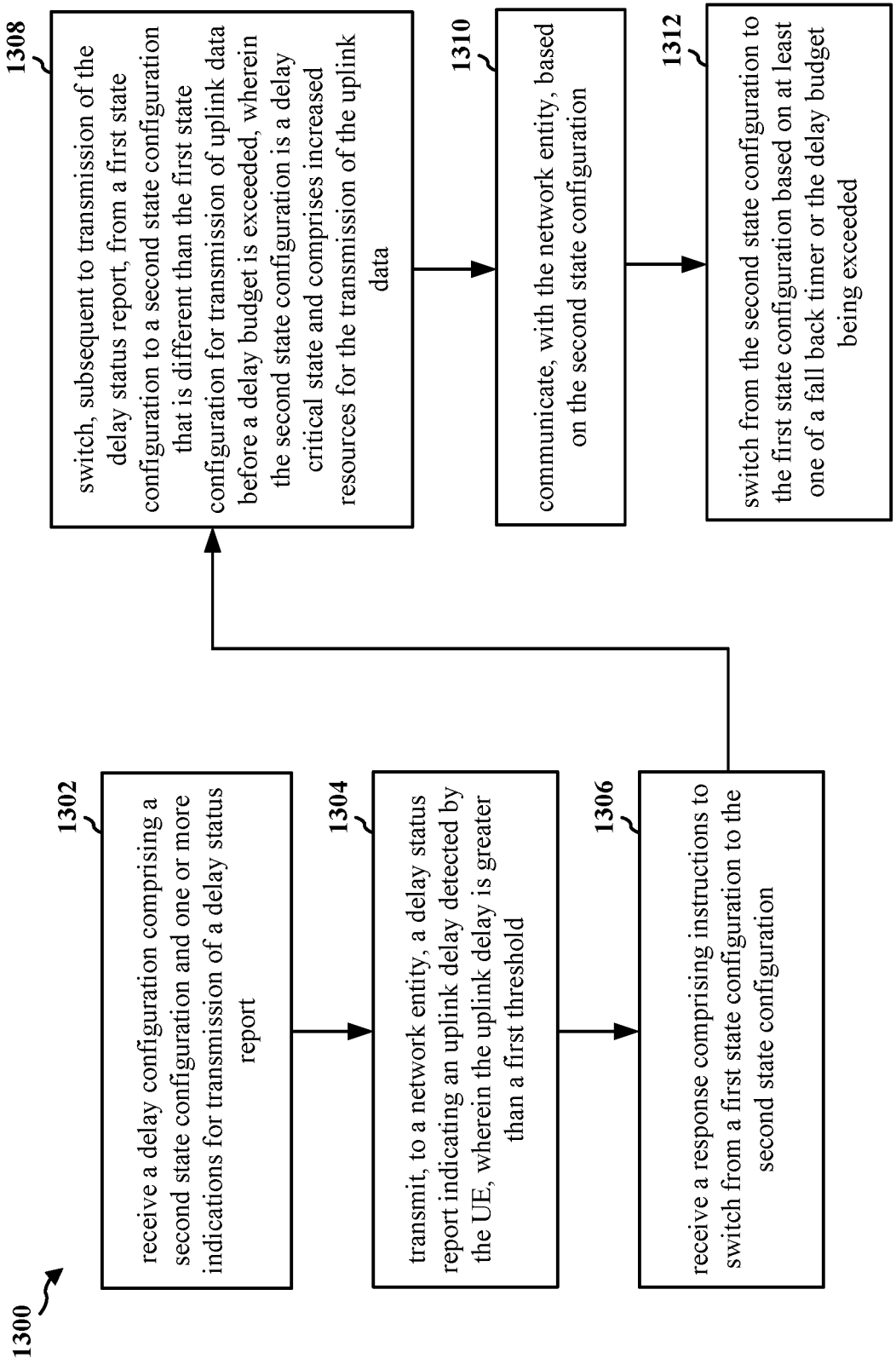
FIG. 13 is a flowchart of a method of wireless communication.

FIG. 13 is a flowchart 1300 of a method of wireless communication. The method may be performed by a UE (e.g., the UE 104; the apparatus 1404). One or more of the illustrated operations may be omitted, transposed, or contemporaneous. The method may allow a UE to switch to a different configuration to allow for additional resources for uplink data transmissions when uplink delay exceeds a threshold.

At 1302, the UE may receive a delay configuration. For example, 1302 may be performed by delay component 198 of apparatus 1404. The UE may receive the delay configuration from a network entity, as described in connection with any of FIGS. 5-10. The delay configuration may comprise a second state configuration and one or more indications for transmission of a delay status report.

At 1304, the UE may transmit the delay status report. For example, 1304 may be performed by delay component 198 of apparatus 1404. The UE may transmit the delay status report to the network entity, as described in connection with any of FIGS. 5-10. The delay status report may indicate an uplink delay detected by the UE. The uplink delay may be greater than or exceed a first threshold. In some aspects, the uplink delay being greater than or exceeding the first threshold may indicate that the transmission of the uplink data is within a delay limit of the delay budget. For example, the delay limit of the delay budget may correspond to a percentage or a proportion of the delay budget that is met prior to exceeding the delay budget. In some instances, the UE may perform an action in response to the uplink delay being greater than or exceeding the first threshold.

At 1306, the UE may receive a response comprising instructions to switch from the first state configuration to the second state configuration. For example, 1306 may be performed by delay component 198 of apparatus 1404. The UE may receive the response comprising the instructions to switch from the first state configuration to the second state configuration from the network entity, as described in connection with any of FIGS. 5-10. The UE may receive the response comprising instructions to switch from the first state configuration to the second state configuration in response to the transmission of the delay status report.

At 1308, the UE may switch from a first state configuration to the second state configuration. For example, 1204 may be performed by delay component 198 of apparatus 1404. The UE may switch from the first state configuration to the second state configuration subsequent to the transmission the delay status report, as described in connection with any of FIGS. 5-10. In some aspects, the UE may switch from the first state configuration to the second state configuration automatically or in response to transmitting the delay status report, while in some aspects, the UE may switch from the first state configuration to the second state configuration in response to receipt of the instructions from the network entity to switch from the first state configuration to the second state configuration. The UE may switch from the first state configuration to the second state configuration for transmission of uplink data before the delay budget is exceeded. The second state configuration may be different than the first state configuration. The second state configuration may be a delay critical state and may comprise a set of configurations for the transmission of the uplink data. In some aspects, a switch from the first state configuration to the second state configuration may be based on the transmission of the uplink data within the delay limit. For example, the UE may switch from the first state configuration to the second state configuration in response to the transmission of the uplink data within the delay limit. The transmission of the uplink data within the delay limit may trigger the UE to switch from the first state configuration to the second state configuration in an effort to ensure transmission of the uplink data before the delay budget is exceeded. In some aspects, the second state configuration comprises at least one of a biased search space to uplink DCI, a deactivation of monitoring of uplink cancellation, an increased uplink bandwidth part or active bandwidth part, activation of one or more configured grant configurations, activation of SUL, a deactivation of wake up signal monitoring, a deactivation of cancellation indication monitoring, or one or more configurations on RS. In some aspects, the biased search space may comprise a new scaling factor to accommodate for an increase in uplink DCIs. The new scaling factor may configure PDCCH monitoring occasions between downlink DCI and uplink DCI while the UE is in the second state configuration. In some aspects, the switching from the first state configuration to the second state configuration may activate one or more attributes of the second state configuration.

At 1310, the UE may communicate based on the second state configuration. For example, 1310 may be performed by delay component 198 of apparatus 1404. The UE may communicate with the network entity based on the second state configuration, as described in connection with any of FIGS. 5-10.

At 1312, the UE may switch from the second state configuration to the first state configuration. For example, 1312 may be performed by delay component 198 of apparatus 1404. The UE may switch from the second state configuration to the first state configuration based on at least one of a fall back timer or the delay budget being exceeded, as described in connection with any of FIGS. 5-10. The communication with the network entity may be based on the first state configuration after the UE switches from the second state configuration to the first state configuration.

Figure 14:
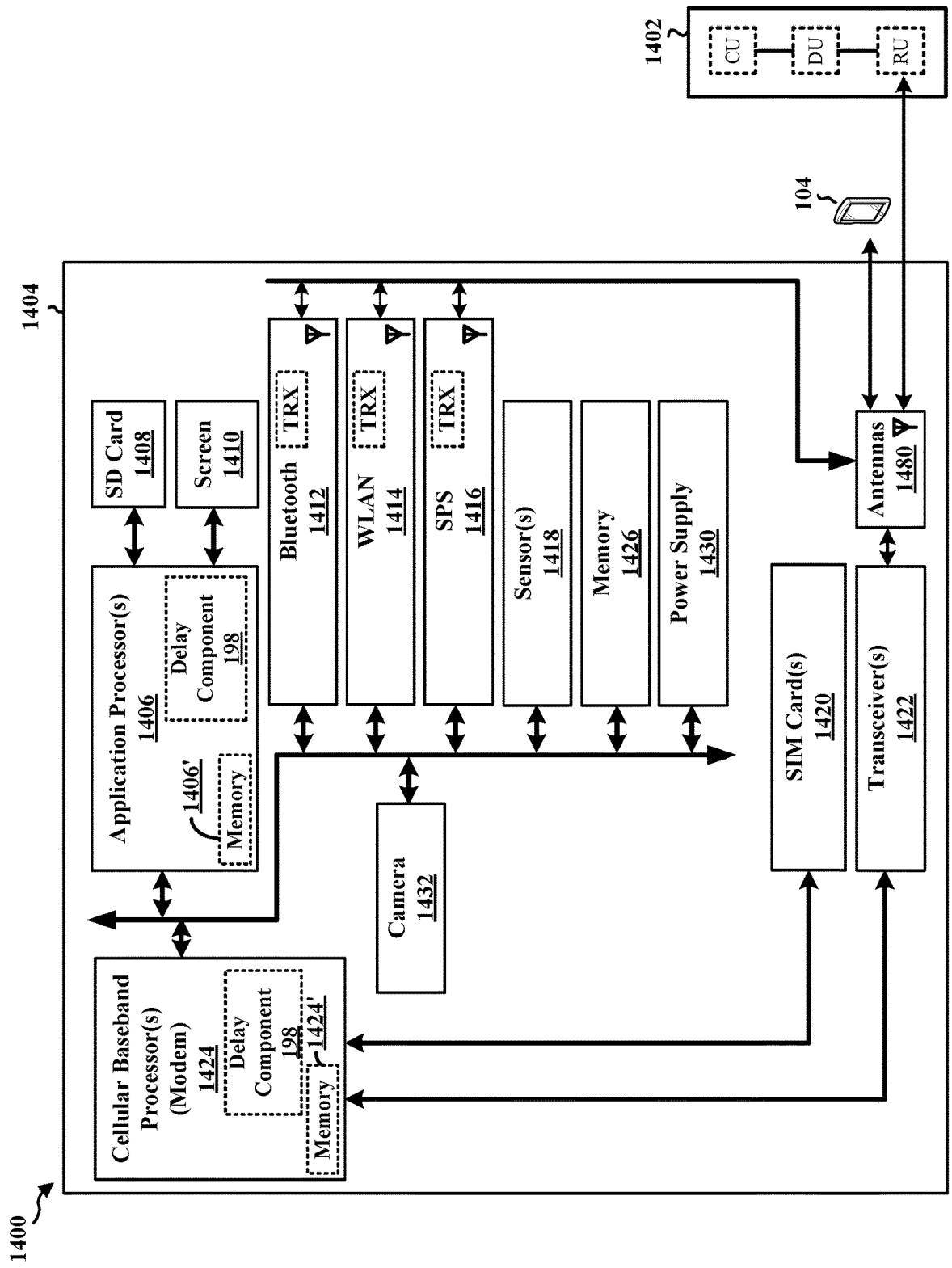
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the component 198 may be configured to transmit, to a network entity, a delay status report indicating an uplink delay detected by the UE, wherein the uplink delay is greater than a first threshold; switch, subsequent to the transmitting the delay status report, from a first state configuration to a second state configuration that is different than the first state configuration for transmission of uplink data before a delay budget is exceeded, wherein the second state configuration is a delay critical state and comprises a set of configurations for the transmission of the uplink data; and communicating, with the network entity, based on the second state configuration. The component 198 may be within the cellular baseband processor(s) 1424, the application processor(s) 1406, or both the cellular baseband processor(s) 1424 and the application processor(s) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for transmitting, to a network entity, a delay status report indicating an uplink delay detected by the UE, wherein the uplink delay is greater than a first threshold. The apparatus includes means for switching, subsequent to the transmitting the delay status report, from a first state configuration to a second state configuration that is different than the first state configuration for transmission of uplink data before a delay budget is exceeded. The second state configuration is a delay critical state and comprises a set of configurations for the transmission of the uplink data. The apparatus includes means for communicating, with the network entity, based on the second state configuration. The apparatus further includes means for switching from the second state configuration to the first state configuration based on at least one of a fall back timer or the delay budget being exceeded. Communication with the network entity is based on the first state configuration. The apparatus further includes means for receiving a delay configuration comprising the second state configuration and one or more indications for transmission of the delay status report. The apparatus further includes means for receiving a response comprising instructions to switch from the first state configuration to the second state configuration. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
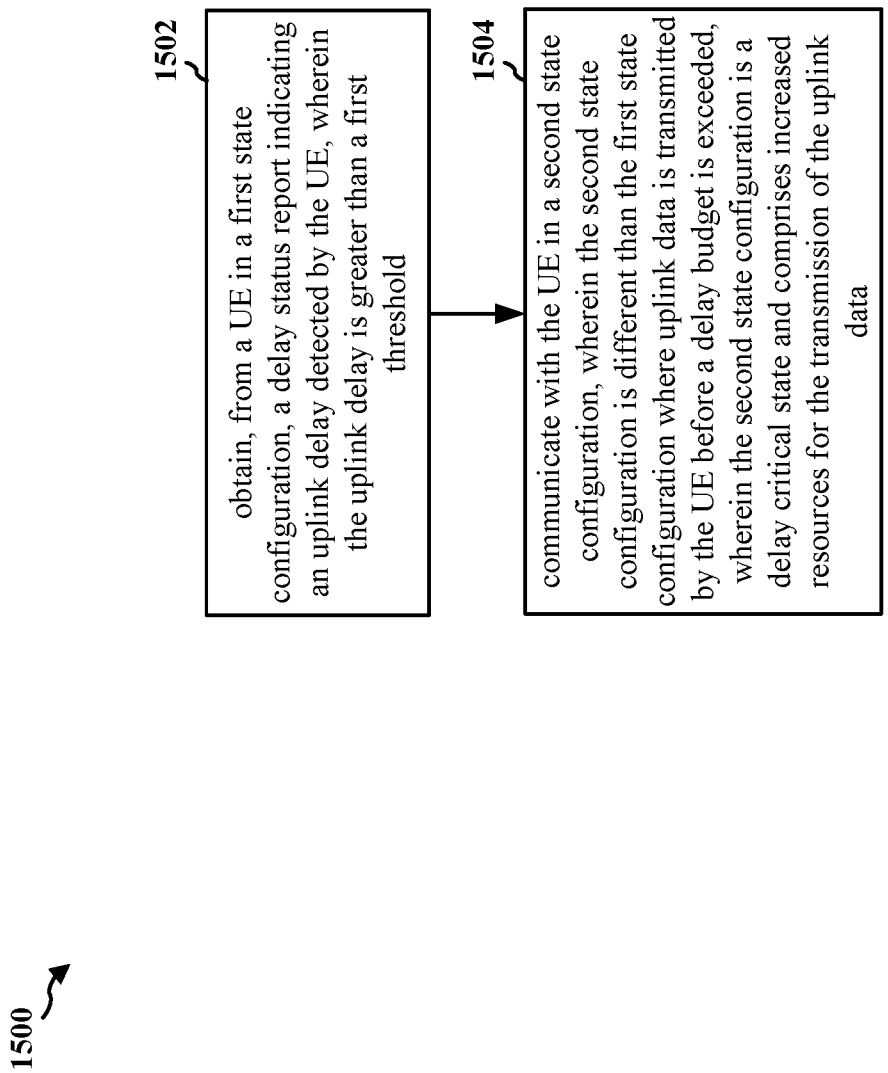
FIG. 15 is a flowchart of a method of wireless communication.

FIG. 15 is a flowchart 1500 of a method of wireless communication. The method may be performed by a base station (e.g., the base station 102; the network entity 1402, 1702). One or more of the illustrated operations may be omitted, transposed, or contemporaneous. The method may configure a UE to switch to a different configuration to allow for additional resources for uplink data transmissions when uplink delay exceeds a threshold.

At 1502, the network entity may obtain a delay status report, as described in connection with any of FIGS. 5-10. For example, 1502 may be performed by delay component 199 of network entity 1702. The network entity may obtain the delay status report from a UE operating in a first state configuration. The delay status report may indicate an uplink delay detected by the UE. The uplink delay may be greater than or exceed a first threshold. In some aspects, the uplink delay being greater than or exceeding the first threshold may indicate that the transmission of the uplink data is within a delay limit of the delay budget. For example, the delay limit of the delay budget may correspond to a percentage or a proportion of the delay budget that is met prior to exceeding the delay budget. In some instances, the UE may perform an action in response to the uplink delay being greater than or exceeding the first threshold.

At 1504, the network entity may communicate with the UE in a second state configuration, as described in connection with any of FIGS. 5-10. For example, 1504 may be performed by delay component 199 of network entity 1702. The second state configuration may be different than the first state configuration where uplink data is transmitted by the UE before a delay budget is exceeded. The second state configuration may be a delay critical state and may comprise a set of configurations for the transmission of the uplink data. In some aspects, the second state configuration comprises at least one of a biased search space to uplink DCI, a deactivation of monitoring of uplink cancellation, an increased uplink bandwidth part or active bandwidth part, activation of one or more configured grant configurations, activation of SUL, a deactivation of wake up signal monitoring, a deactivation of cancellation indication monitoring, or one or more configurations on RS. In some aspects, the biased search space may comprise a new scaling factor to accommodate for an increase in uplink DCIs. The new scaling factor may configure PDCCH monitoring occasions between downlink DCI and uplink DCI while the UE is in the second state configuration. In some aspects, the UE may switch from the second state configuration to the first state configuration based on at least one of a fall back timer or the delay budget being exceeded. The communication with the network entity may be based on the first state configuration after the UE switches from the second state configuration to the first state configuration.

Figure 16:
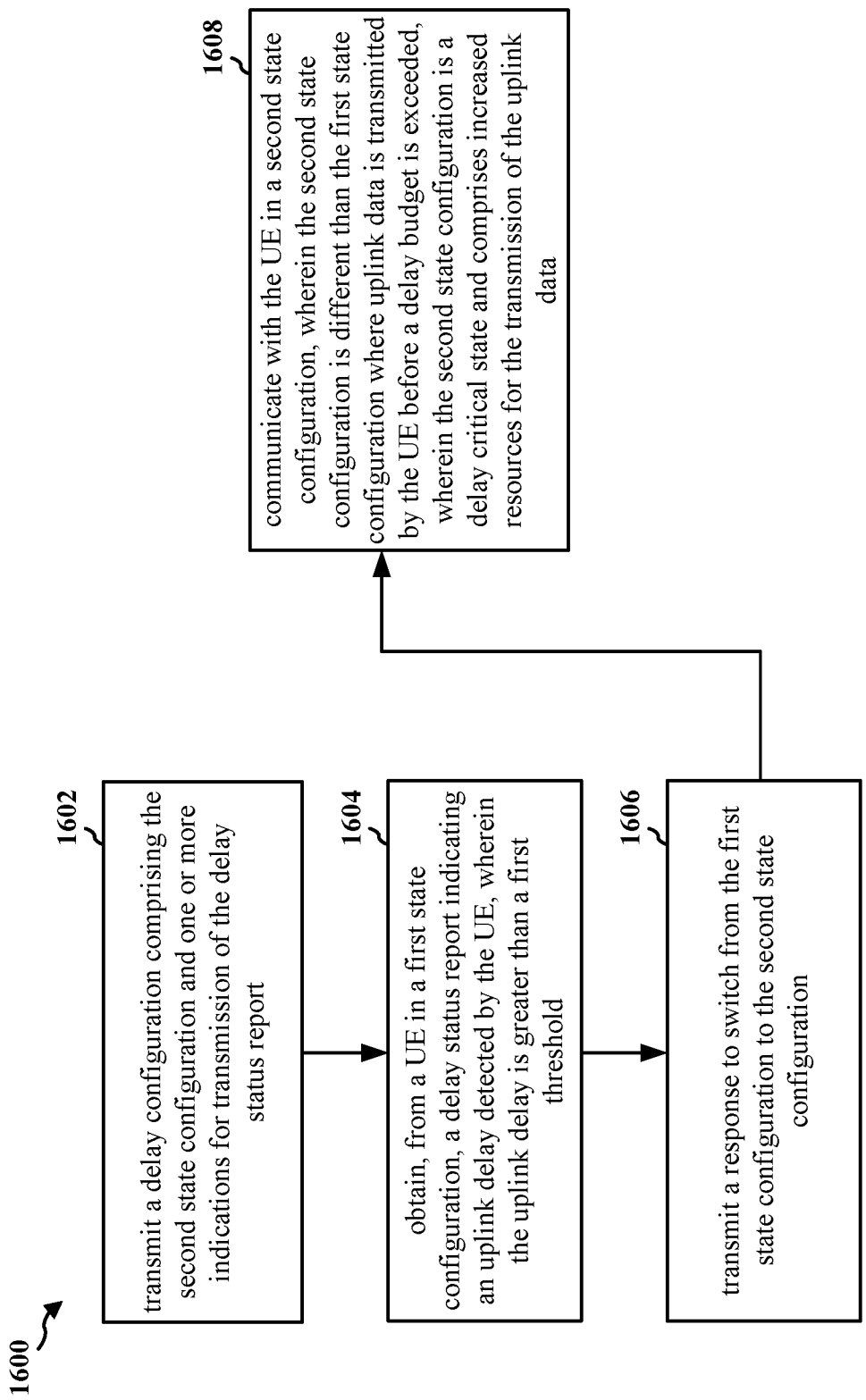
FIG. 16 is a flowchart of a method of wireless communication.

FIG. 16 is a flowchart 1600 of a method of wireless communication. The method may be performed by a base station (e.g., the base station 102; the network entity 1402, 1702). One or more of the illustrated operations may be omitted, transposed, or contemporaneous. The method may configure a UE to switch to a different configuration to allow for additional resources for uplink data transmissions when uplink delay exceeds a threshold.

At 1602, the network entity may transmit a delay configuration, as described in connection with any of FIGS. 5-10. For example, 1602 may be performed by delay component 199 of network entity 1702. The network entity may transmit the delay configuration to a UE. The delay configuration may comprise a second state configuration and one or more indications for transmission of a delay status report.

At 1604, the network entity may obtain a delay status report, as described in connection with any of FIGS. 5-10. For example, 1604 may be performed by delay component 199 of network entity 1702. The network entity may obtain the delay status report from the UE operating in a first state configuration. The delay status report may indicate an uplink delay detected by the UE. The uplink delay may be greater than or exceed a first threshold. In some aspects, the uplink delay being greater than or exceeding the first threshold may indicate that the transmission of the uplink data is within a delay limit of the delay budget. For example, the delay limit of the delay budget may correspond to a percentage or a proportion of the delay budget that is met prior to exceeding the delay budget. In some instances, the UE may perform an action in response to the uplink delay being greater than or exceeding the first threshold.

At 1606, the network entity may transmit a response to switch from the first state configuration to the second state configuration. For example, 1606 may be performed by delay component 199 of network entity 1702. The network entity may transmit the response to switch from the first state configuration to the second state configuration to the UE, as described in connection with any of FIGS. 5-10. The network entity may transmit the response comprising instructions for the UE to switch from the first state configuration to the second state configuration in response to obtaining the delay status report from the UE.

At 1608 the network entity may communicate with the UE in a second state configuration. For example, 1608 may be performed by delay component 199 of network entity 1702. The second state configuration may be different than the first state configuration where uplink data is transmitted by the UE before a delay budget is exceeded, as described in connection with any of FIGS. 5-10. The second state configuration may be a delay critical state and may comprise a set of configurations for the transmission of the uplink data. In some aspects, the second state configuration comprises at least one of a biased search space to uplink DCI, a deactivation of monitoring of uplink cancellation, an increased uplink bandwidth part or active bandwidth part, activation of one or more configured grant configurations, activation of SUL, a deactivation of wake up signal monitoring, a deactivation of cancellation indication monitoring, or one or more configurations on RS. In some aspects, the biased search space may comprise a new scaling factor to accommodate for an increase in uplink DCIs. The new scaling factor may configure PDCCH monitoring occasions between downlink DCI and uplink DCI while the UE is in the second state configuration. In some aspects, the UE may switch from the second state configuration to the first state configuration based on at least one of a fall back timer or the delay budget being exceeded. The communication with the network entity may be based on the first state configuration after the UE switches from the second state configuration to the first state configuration.

Figure 17:
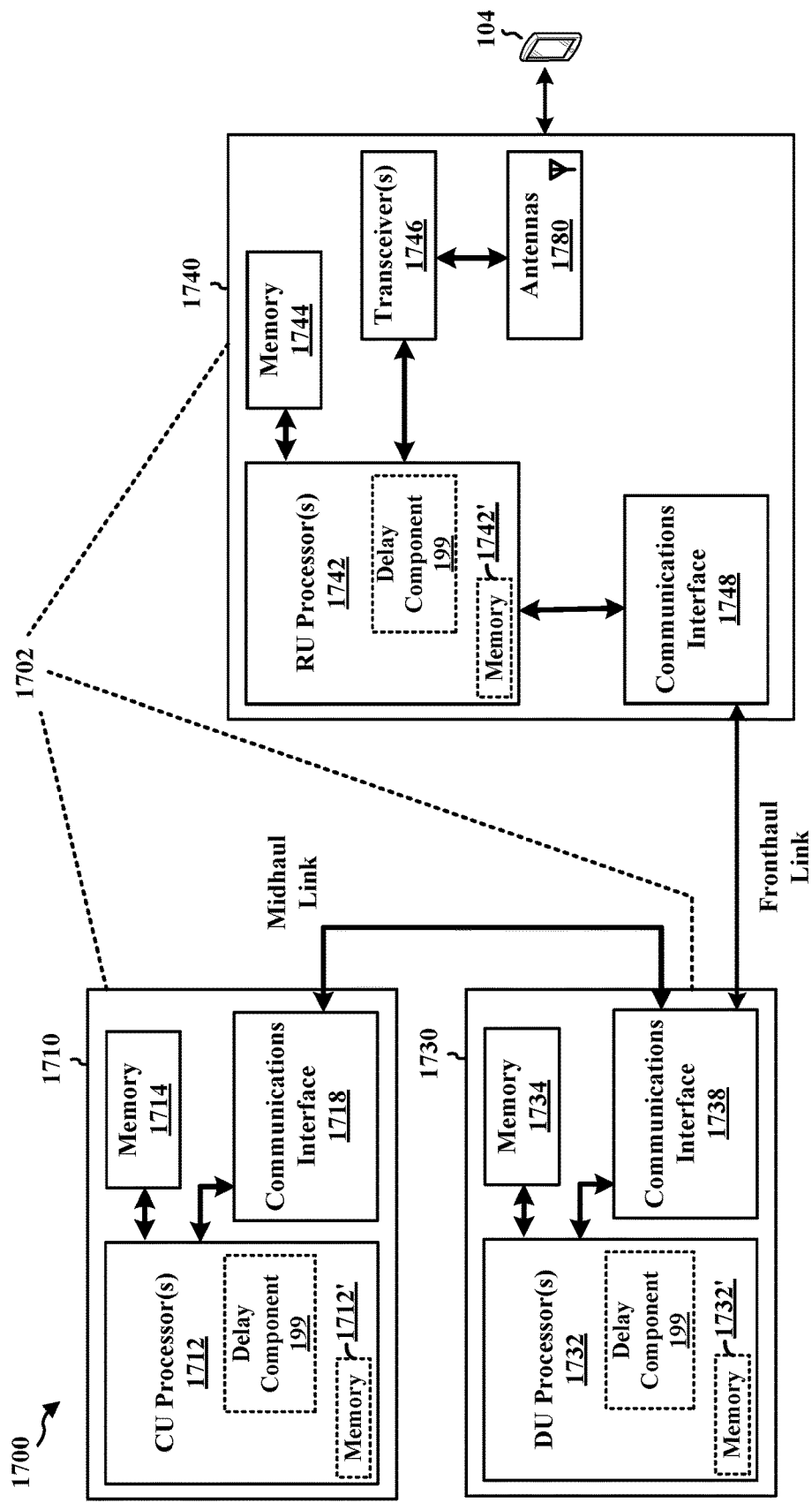
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include at least one CU processor 1712. The CU processor(s) 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include at least one DU processor 1732. The DU processor(s) 1732 may include on-chip memory 1732'. In some aspects, the DU 1730 may further include additional memory modules 1734 and a communications interface 1738. The DU 1730 communicates with the RU 1740 through a fronthaul link. The RU 1740 may include at least one RU processor 1742. The RU processor(s) 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to obtain, from a UE in a first state configuration, a delay status report indicating an uplink delay detected by the UE, wherein the uplink delay is greater than a first threshold; and communicate with the UE in a second state configuration, wherein the second state configuration is different than the first state configuration where uplink data is transmitted by the UE before a delay budget is exceeded, wherein the second state configuration is a delay critical state and comprises a set of configurations for the transmission of the uplink data. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1702 may include a variety of components configured for various functions. In one configuration, the network entity 1702 may include means for obtaining, from a UE in a first state configuration, a delay status report indicating an uplink delay detected by the UE, wherein the uplink delay is greater than a first threshold. The network entity includes means for communicating with the UE in a second state configuration, wherein the second state configuration is different than the first state configuration where uplink data is transmitted by the UE before a delay budget is exceeded. The second state configuration is a delay critical state and comprises a set of configurations for the transmission of the uplink data. The network entity further includes means for transmitting a delay configuration comprising the second state configuration and one or more indications for transmission of the delay status report. The network entity further includes means for transmitting a response to switch from the first state configuration to the second state configuration. The means may be the component 199 of the network entity 1702 configured to perform the functions recited by the means. As described supra, the network entity 1702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE comprising transmitting, to a network entity, a delay status report indicating an uplink delay detected by the UE, wherein the uplink delay is greater than a first threshold; switching, subsequent to transmission of the delay status report, from a first state configuration to a second state configuration that is different than the first state configuration for transmission of uplink data before a delay budget is exceeded, wherein the second state configuration is a delay critical state and comprises a set of configurations for the transmission of the uplink data; and communicating, with the network entity, based on the second state configuration.

Aspect 2 is the method of aspect 1, further includes that the uplink delay greater than the first threshold indicates that the transmission of the uplink data is within a delay limit of the delay budget, wherein a switch from the first state configuration to the second state configuration is based on the transmission of the uplink data within the delay limit.

Aspect 3 is the method of aspects 1 and 2, further includes that the second state configuration comprises at least one of a biased search space to uplink DCI; a deactivation of monitoring of uplink cancellation; an increased uplink bandwidth part or active bandwidth part; activation of one or more configured grant configurations; activation of SUL; a deactivation of wake up signal monitoring; a deactivation of cancellation indication monitoring; or one or more configurations on RS.

Aspect 4 is the method of any of aspects 1-3, further includes that the switch from the first state configuration to the second state configuration activates one or more attributes of the second state configuration.

Aspect 5 is the method of any of aspects 1-4, further including switching from the second state configuration to the first state configuration based on at least one of a fall back timer or the delay budget being exceeded, wherein communication with the network entity is based on the first state configuration.

Aspect 6 is the method of any of aspects 1-5, further including receiving a delay configuration comprising the second state configuration and one or more indications for transmission of the delay status report.

Aspect 7 is the method of any of aspects 1-6, further includes that the biased search space comprises a new scaling factor to accommodate for an increase in uplink DCIs, wherein the new scaling factor configures PDCCH monitoring occasions between downlink DCI and uplink DCI while in the second state configuration.

Aspect 8 is the method of any of aspects 1-7, further including receiving a response comprising instructions to switch from the first state configuration to the second state configuration.

Aspect 9 is an apparatus for wireless communication at a UE including at least one processor coupled to a memory and at least one transceiver, the at least one processor configured to implement any of Aspects 1-8.

Aspect 10 is an apparatus for wireless communication at a UE including means for implementing any of Aspects 1-8.

Aspect 11 is a computer-readable medium storing computer executable code, where the code when executed by a processor causes the processor to implement any of Aspects 1-8.

Aspect 12 is a method of wireless communication at a network entity comprising obtaining, from a UE in a first state configuration, a delay status report indicating an uplink delay detected by the UE, wherein the uplink delay is greater than a first threshold; and communicating with the UE in a second state configuration, wherein the second state configuration is different than the first state configuration where uplink data is transmitted by the UE before a delay budget is exceeded, wherein the second state configuration is a delay critical state and comprises a set of configurations for transmission of the uplink data.

Aspect 13 is the method of aspect 12, further includes that the uplink delay greater than the first threshold indicates that the transmission of the uplink data is within a delay limit of the delay budget, wherein a switch from the first state configuration to the second state configuration is based on the transmission of the uplink data within the delay limit.

Aspect 14 is the method of aspects 12 and 13, further includes that the second state configuration comprises at least one of a biased search space to uplink DCI; a deactivation of monitoring of uplink cancellation; an increased uplink bandwidth part or active bandwidth part; activation of one or more configured grant configurations; activation of SUL; a deactivation of wake up signal monitoring; a deactivation of cancellation indication monitoring; or one or more configurations on RS.

Aspect 15 is the method of any of aspects 12-14, further including transmitting a delay configuration comprising the second state configuration and one or more indications for transmission of the delay status report.

Aspect 16 is the method of any of aspects 12-15, further includes that the biased search space comprises a new scaling factor to accommodate for an increase in uplink DCIs, wherein the new scaling factor configures PDCCH monitoring occasions between downlink DCI and uplink DCI for the UE in the second state configuration.

Aspect 17 is the method of any of aspects 12-16, further including transmitting a response to switch from the first state configuration to the second state configuration.

Aspect 18 is an apparatus for wireless communication at a network entity including at least one processor coupled to a memory and at least one transceiver, the at least one processor configured to implement any of Aspects 12-17.

Aspect 19 is an apparatus for wireless communication at a network entity including means for implementing any of Aspects 12-17.

Aspect 20 is a computer-readable medium storing computer executable code, where the code when executed by a processor causes the processor to implement any of Aspects 12-17.

What is claimed is:

1. An apparatus for wireless communication at a user equipment (UE), comprising:
   at least one memory; and
   at least one processor coupled to the at least one memory and, based at least in part on information stored in the at least one memory, the at least one processor, individually or in any combination, is configured to cause the apparatus to:
   transmit, to a network entity, a delay status report indicating an uplink delay detected by the UE, wherein the uplink delay is greater than a first threshold;
   switch, subsequent to transmission of the delay status report, from a first state configuration to a second state configuration that is different than the first state configuration for transmission of uplink data before a delay budget is exceeded, wherein the second state configuration is a delay critical state and comprises a set of configurations for the transmission of the uplink data; and
   communicate, with the network entity, based on the second state configuration.

2. The apparatus of claim 1, further comprising a transceiver coupled to the at least one processor, the transceiver being configured to:
   transmit, to the network entity, the delay status report indicating the uplink delay detected by the UE, wherein the uplink delay is greater than the first threshold; and
   communicate, with the network entity, based on the second state configuration.

3. The apparatus of claim 1, wherein the uplink delay greater than the first threshold indicates that the transmission of the uplink data is within a delay limit of the delay budget, wherein a switch from the first state configuration to the second state configuration is based on the transmission of the uplink data within the delay limit.

4. The apparatus of claim 1, wherein the second state configuration comprises at least one of:
   a biased search space to uplink downlink control information (DCI);
   a deactivation of monitoring of uplink cancellation;
   an increased uplink bandwidth part or active bandwidth part;
   activation of one or more configured grant configurations;
   activation of supplementary uplink (SUL);
   a deactivation of wake up signal monitoring;
   a deactivation of cancellation indication monitoring; or
   one or more configurations on reference signal (RS).

5. The apparatus of claim 4, wherein the switch from the first state configuration to the second state configuration activates one or more attributes of the second state configuration.

6. The apparatus of claim 1, wherein the at least one processor is configured to cause the apparatus to:
   switch from the second state configuration to the first state configuration based on at least one of a fall back timer or the delay budget being exceeded, wherein communication with the network entity is based on the first state configuration.

7. The apparatus of claim 1, wherein the at least one processor is configured to cause the apparatus to:
   receive a delay configuration comprising the second state configuration and one or more indications for transmission of the delay status report.

8. The apparatus of claim 4, wherein the biased search space comprises a new scaling factor to accommodate for an increase in uplink DCIs, wherein the new scaling factor configures physical downlink control channel (PDCCH) monitoring occasions between downlink DCI and uplink DCI while in the second state configuration.

9. The apparatus of claim 1, wherein the at least one processor is configured to cause the apparatus to:
   receive a response comprising instructions to switch from the first state configuration to the second state configuration.

10. A method of wireless communication at a user equipment (UE), comprising:
    transmitting, to a network entity, a delay status report indicating an uplink delay detected by the UE, wherein the uplink delay is greater than a first threshold;
    switching, subsequent to the transmitting the delay status report, from a first state configuration to a second state configuration that is different than the first state configuration for transmission of uplink data before a delay budget is exceeded, wherein the second state configuration is a delay critical state and comprises a set of configurations for the transmission of the uplink data; and
    communicating, with the network entity, based on the second state configuration.

11. The method of claim 10, wherein the uplink delay greater than the first threshold indicates that the transmission of the uplink data is within a delay limit of the delay budget, wherein a switch from the first state configuration to the second state configuration is based on the transmission of the uplink data within the delay limit.

12. The method of claim 10, wherein the second state configuration comprises at least one of:
    a biased search space to uplink downlink control information (DCI);
    a deactivation of monitoring of uplink cancellation;
    an increased uplink bandwidth part or active bandwidth part;
    activation of one or more configured grant configurations;
    activation of supplementary uplink (SUL);

a deactivation of wake up signal monitoring;
a deactivation of cancellation indication monitoring; or
one or more configurations on reference signal (RS).

13. The method of claim 12, wherein the switching from the first state configuration to the second state configuration activates one or more attributes of the second state configuration.

14. The method of claim 10, further comprising:
switching from the second state configuration to the first state configuration based on at least one of a fall back timer or the delay budget being exceeded, wherein communication with the network entity is based on the first state configuration.

15. The method of claim 10, further comprising:
receiving a delay configuration comprising the second state configuration and one or more indications for transmission of the delay status report.

16. The method of claim 12, wherein the biased search space comprises a new scaling factor to accommodate for an increase in uplink DCIs, wherein the new scaling factor configures physical downlink control channel (PDCCH) monitoring occasions between downlink DCI and uplink DCI while in the second state configuration.

17. The method of claim 10, further comprising:
receiving a response comprising instructions to switch from the first state configuration to the second state configuration.

18. An apparatus for wireless communication at a network entity, comprising:
at least one memory; and
at least one processor coupled to the at least one memory and, based at least in part on information stored in the at least one memory, the at least one processor, individually or in any combination, is configured to cause the apparatus to:
obtain, from a user equipment (UE) in a first state configuration, a delay status report indicating an uplink delay detected by the UE, wherein the uplink delay is greater than a first threshold; and
communicate with the UE in a second state configuration, wherein the second state configuration is different than the first state configuration where uplink data is transmitted by the UE before a delay budget is exceeded, wherein the second state configuration is a delay critical state and comprises a set of configurations for transmission of the uplink data.

19. The apparatus of claim 18, further comprising a transceiver coupled to the at least one processor, the transceiver being configured to:
obtain, from the UE in the first state configuration, the delay status report indicating the uplink delay detected by the UE, wherein the uplink delay is greater than the first threshold; and
communicate with the UE in the second state configuration, wherein the second state configuration is different than the first state configuration where the uplink data is transmitted by the UE before the delay budget is exceeded, wherein the second state configuration is the delay critical state and comprises a set of configurations for the transmission of the uplink data.

20. The apparatus of claim 18, wherein the uplink delay greater than the first threshold indicates that the transmission of the uplink data is within a delay limit of the delay budget, wherein a switch from the first state configuration to the second state configuration is based on the transmission of the uplink data within the delay limit.

21. The apparatus of claim 18, wherein the second state configuration comprises at least one of:
a biased search space to uplink downlink control information (DCI);
a deactivation of monitoring of uplink cancellation;
an increased uplink bandwidth part or active bandwidth part;
activation of one or more configured grant configurations;
activation of supplementary uplink (SUL);
a deactivation of wake up signal monitoring;
a deactivation of cancellation indication monitoring; or
one or more configurations on reference signal (RS).

22. The apparatus of claim 18, wherein the at least one processor is configured to cause the apparatus to:
transmit a delay configuration comprising the second state configuration and one or more indications for transmission of the delay status report.

23. The apparatus of claim 21, wherein the biased search space comprises a new scaling factor to accommodate for an increase in uplink DCIs, wherein the new scaling factor configures physical downlink control channel (PDCCH) monitoring occasions between downlink DCI and uplink DCI for the UE in the second state configuration.

24. The apparatus of claim 18, wherein the at least one processor is configured to cause the apparatus to:
transmit a response to switch from the first state configuration to the second state configuration.

25. A method of wireless communication at a network entity, comprising:
obtaining, from a user equipment (UE) in a first state configuration, a delay status report indicating an uplink delay detected by the UE, wherein the uplink delay is greater than a first threshold; and
communicating with the UE in a second state configuration, wherein the second state configuration is different than the first state configuration where uplink data is transmitted by the UE before a delay budget is exceeded, wherein the second state configuration is a delay critical state and comprises a set of configurations for transmission of the uplink data.

26. The method of claim 25, wherein the uplink delay greater than the first threshold indicates that the transmission of the uplink data is within a delay limit of the delay budget, wherein a switch from the first state configuration to the second state configuration is based on the transmission of the uplink data within the delay limit.

27. The method of claim 25, wherein the second state configuration comprises at least one of:
a biased search space to uplink downlink control information (DCI);
a deactivation of monitoring of uplink cancellation;
an increased uplink bandwidth part or active bandwidth part;
activation of one or more configured grant configurations;
activation of supplementary uplink (SUL);
a deactivation of wake up signal monitoring;
a deactivation of cancellation indication monitoring; or
one or more configurations on reference signal (RS).

28. The method of claim 25, further comprising:
transmitting a delay configuration comprising the second state configuration and one or more indications for transmission of the delay status report.

29. The method of claim 27, wherein the biased search space comprises a new scaling factor to accommodate for an increase in uplink DCIs, wherein the new scaling factor configures physical downlink control channel (PDCCH)

monitoring occasions between downlink DCI and uplink DCI for the UE in the second state configuration.

30. The method of claim 25, further comprising:
transmitting a response to switch from the first state configuration to the second state configuration.

* * * * *